United States Patent [19]

Grohoski et al.

[11] Patent Number: 5,479,622
[45] Date of Patent: Dec. 26, 1995

[54] SINGLE CYCLE DISPATCH DELAY IN A MULTIPLE INSTRUCTION DISPATCH MECHANISM OF A DATA PROCESSING SYSTEM

[75] Inventors: Gregory F. Grohoski, Cedar Park; Randall D. Groves, Austin, both of Tex.

[73] Assignee: International Business Machines Corporation, Armonk, N.Y.

[21] Appl. No.: 339,315

[22] Filed: Nov. 14, 1994

Related U.S. Application Data

[63] Continuation of Ser. No. 239,170, May 6, 1994, which is a continuation of Ser. No. 4,483, Jan. 12, 1993, which is a continuation of Ser. No. 811,888, Dec. 19, 1991, which is a continuation of Ser. No. 297,713, Jan. 13, 1989, abandoned.

[51] Int. Cl.⁶ ........................................ G06F 9/38
[52] U.S. Cl. .......................... 395/375; 395/800
[58] Field of Search ...................... 395/375, 800

[56] References Cited

U.S. PATENT DOCUMENTS

| | | | |
|---|---|---|---|
| 3,346,851 | 10/1967 | Thornton et al. | 340/172.5 |
| 4,710,866 | 12/1987 | Zolnowsky et al. | 371/16 |
| 4,736,288 | 4/1988 | Shintani et al. | 395/375 |
| 4,755,966 | 7/1988 | Lee et al. | 364/900 |
| 4,766,566 | 8/1988 | Chuang | 364/900 |
| 4,777,587 | 10/1988 | Case et al. | 364/200 |
| 4,782,441 | 11/1988 | Inagami et al. | 395/375 |
| 4,807,115 | 2/1989 | Torny | 395/375 |
| 4,847,755 | 6/1989 | Morrison et al. | 364/200 |
| 4,903,196 | 2/1990 | Pomerene et al. | 395/375 |
| 4,965,717 | 10/1990 | Cutts, Jr. et al. | 364/200 |
| 4,974,155 | 11/1990 | Dulong et al. | 364/200 |
| 4,975,868 | 12/1990 | Freerksen | 364/748 |
| 4,991,080 | 2/1991 | Emma et al. | 364/200 |
| 5,034,880 | 7/1991 | Fang et al. | 364/200 |
| 5,051,885 | 9/1991 | Yates, Jr. et al. | 395/375 |
| 5,075,844 | 12/1991 | Jardine et al. | 395/375 |

OTHER PUBLICATIONS

Acosta et al., "An Instruction Issuing Approach to Enhancing Performance in Multiple Functional Unit Processors," *IEEE Transactions on Computers*, vol. C–35, No. 9, Sep. 1986.

IBM Technical Disclosure Bulletin, entitled "Condition Code and Branch Architecture for High Performance Processors", vol. 25, No. 1, Jun. 1982, pp. 136–137.

IBM Technical Disclosure Bulletin, "Condition Code Facility", vol. 29, No. 7, Dec. 1986, pp. 3176–3177.

IBM Technical Disclosure Bulletin, entitled "Multiple Queued Condition Codes", vol. 31, No. 2, Jul. 1988, pp. 294–296.

Proceedings of the 2nd International Conference on Architectural Support for Programming Languages and Operating Systems, Palo Alto, Calif., 5th–8th Oct., 1987, pp. 199–204 by J. E. Smith et al, "The ZS–1 Central Processor".

IBM Technical Disclosure Bulletin, T. Agerwala, vol. 25, No. 1, Jun. 1982, "Improved Condition Code and Branch Handling for Model 91–Like Implementation of the IBM System/370 Architecture", pp. 134–135.

"Streamlined Instruction Processor, User's Manual", AM29000, copyright 1987 Advanced Micro Devices, pp. 3–30 thru 3–32.

(List continued on next page.)

*Primary Examiner*—William M. Treat
*Attorney, Agent, or Firm*—Casimer K. Salys; Thomas E. Tyson

[57] ABSTRACT

A data processing system including a circuit for storing a plurality of instructions in a sequence together with a circuit for fetching a plurality of instructions. A circuit is provided for dispatching a plurality of the instructions to one or more processors for execution during a single computation cycle. A control circuit is connected to the dispatching circuit to delay the dispatching of an instruction. When the instruction has an execution result that is dependent upon a previous instruction execution that will set at least one bit in a condition register. The delayed instruction is delayed until that condition register has been accordingly set.

35 Claims, 11 Drawing Sheets

OTHER PUBLICATIONS

"Reduced Instruction Set Computer (RISC) User's Manual", MC88100, Motorola Microprocessor Group, pp. 1–11 thru 1–12.

"The Architecture of Pipelined Computers", Peter Kogge. Sections 4.2.3 and 6.3.3.

EXAMPLE 1:

NO DEPENDENCIES

| CYCLE | 1 | 2 | 3 | 4 | 5 |
|---|---|---|---|---|---|
| FETCH | I1-I3 | I4-I6 | I7-I9 | | |
| DISPATCH | | I1-I3 | I4-I6 | I7-I9 | |
| P1 DECODE | | | I1 | I4 | I7 |
| P1 EXECUTE | | | | I1 | I4 |
| P2 DECODE | | | I2 | I5 | I8 |
| P2 EXECUTE | | | | I2 | I5 |
| P3 DECODE | | | I3 | I6 | I9 |
| P3 EXECUTE | | | | I3 | I6 |

FIG. 13

EXAMPLE 2:

I3 DEPENDS ON PREVIOUS I0

| CYCLE | 1 | 2 | 3 | 4 | 5 |
|---|---|---|---|---|---|
| FETCH | I1-I3 | I4-I6 | I7-I9 | | |
| DISPATCH | | I1-I2 | I3-I5 | I6-I8 | |
| P1 DECODE | I0 | | I1 | I4 | I7 |
| P1 EXECUTE | | I0 | | I1 | I4 |
| P2 DECODE | | | I2 | I5 | I8 |
| P2 EXECUTE | | | | I2 | I5 |
| P3 DECODE | | | | I3 | I6 |
| P3 EXECUTE | | | | | I3 |

FIG. 14

EXAMPLE 3:

I3 DEPENDS ON I1

| CYCLE | 1 | 2 | 3 | 4 | 5 | 6 | 7 | 8 |
|---|---|---|---|---|---|---|---|---|
| FETCH | I1-I3 | I4-I6 | I7-I9 | I10-I12 | | | | |
| DISPATCH | | I1-I2 | | | I3-I5 | I6-I8 | I9-I11 | |
| P1 DECODE | | | I1 | | | I4 | I7 | I10 |
| P1 EXECUTE | | | | I1 | | | I4 | I7 |
| P2 DECODE | | | I2 | | | I5 | I8 | I11 |
| P2 EXECUTE | | | | I2 | | | I5 | I8 |
| P3 DECODE | | | | | | I3 | I6 | I9 |
| P3 EXECUTE | | | | | | | I3 | I6 |

SINGLE CYCLE DISPATCH DELAY IN A MULTIPLE INSTRUCTION DISPATCH MECHANISM OF A DATA PROCESSING SYSTEM

This a continuation of application Ser. No. 08/239,170 filed on May 6, 1994, which is a continuation of Ser. No. 08/004,483 filed on Jan. 12, 1993, which is a continuation of application Ser. No. 07/811,888 filed on Dec. 19, 1991, which is a continuation of Ser. No. 07/297,713 filed on Jan. 13, 1989 now abandoned.

FIELD OF THE INVENTION

This invention relates to data processing systems and more specifically to a mechanism within the data processing system for dispatching instructions for execution.

BACKGROUND ART

Traditionally, instruction sequences have been executed in data processing systems one at a time. In other words, in an instruction sequence a first instruction execution is completed before a next instruction executed is begun. In more modern pipeline approaches, instruction execution is divided into different phases. Therefore, multiple instructions are executed simultaneously by providing that the execution of the different phases are overlapped.

*IBM Technical Disclosure Bulletin*, Vol. 25, No. 1, June, 1982, pages 136–137, addresses a concept of the use of a multiple field condition register where each field is dedicated to the execution of architecturally separate instructions. This results in increased concurrency in simple condition code management.

*IBM Technical Disclosure Bulletin*, Vol. 29, No. 7, December, 1986, pages 3176–3177, discloses two additional fields for use in the condition register.

*IBM Technical Disclosure Bulletin*, Vol. 31, No. 2, July, 1988, pages 294–296, discloses a condition code register that retains the results of several arithmetic, logic or comparison operations to increase the opportunity for parallelism in operation.

It is the object of the present invention to provide an instruction dispatch apparatus that insures the proper order of instruction dispatching for execution in relationship with the setting of condition codes in a condition register.

SUMMARY OF THE INVENTION

In accordance with the present invention, a data processing system is provided that includes a circuit for storing a plurality of instructions in a sequence together with a circuit for fetching a plurality of stored instructions. Also included is a circuit that dispatches a plurality of the instructions to one or more processors for execution during a single computation cycle. The dispatching and fetching circuits are connected to a control circuit that delays the dispatching of an instruction when the instruction has an execution result that is dependent upon a previous instruction execution setting at least one bit in a condition register. The instruction is delayed until the condition register has accordingly been set by the previously dispatched instruction.

Also, in accordance with the present invention, a data processing system is provided that includes a circuit for storing a plurality of instructions in a sequence together with a circuit for fetching a plurality of instructions. Also included is the dispatching circuit to dispatch a plurality of instructions to the one or more-processors for execution during a single computation cycle. A control circuit is provided that delays the dispatching of an instruction when execution of the instruction will result in a setting of at least ode bit in a condition register before a previous instruction execution has completed accessing that same bit in the condition register. The delayed instruction will be delayed until the condition register access has been completed by the previous instruction.

BRIEF DESCRIPTION OF THE DRAWING

The novel features believed characteristics of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

This invention addresses the dispatching of instruction to a multiple of processors. In this invention the instruction sequence is to be executed one at a time as if the instructions were executed in their order of appearance in the instruction sequence itself. However, because a multiple processing capability is provided, instructions may be executed ahead of sequence. This invention specifically addresses the problem of ensuring that instructions depending on a previous instruction condition register modification are not dispatched before instructions that modify a condition register are executed.

Figure 1:
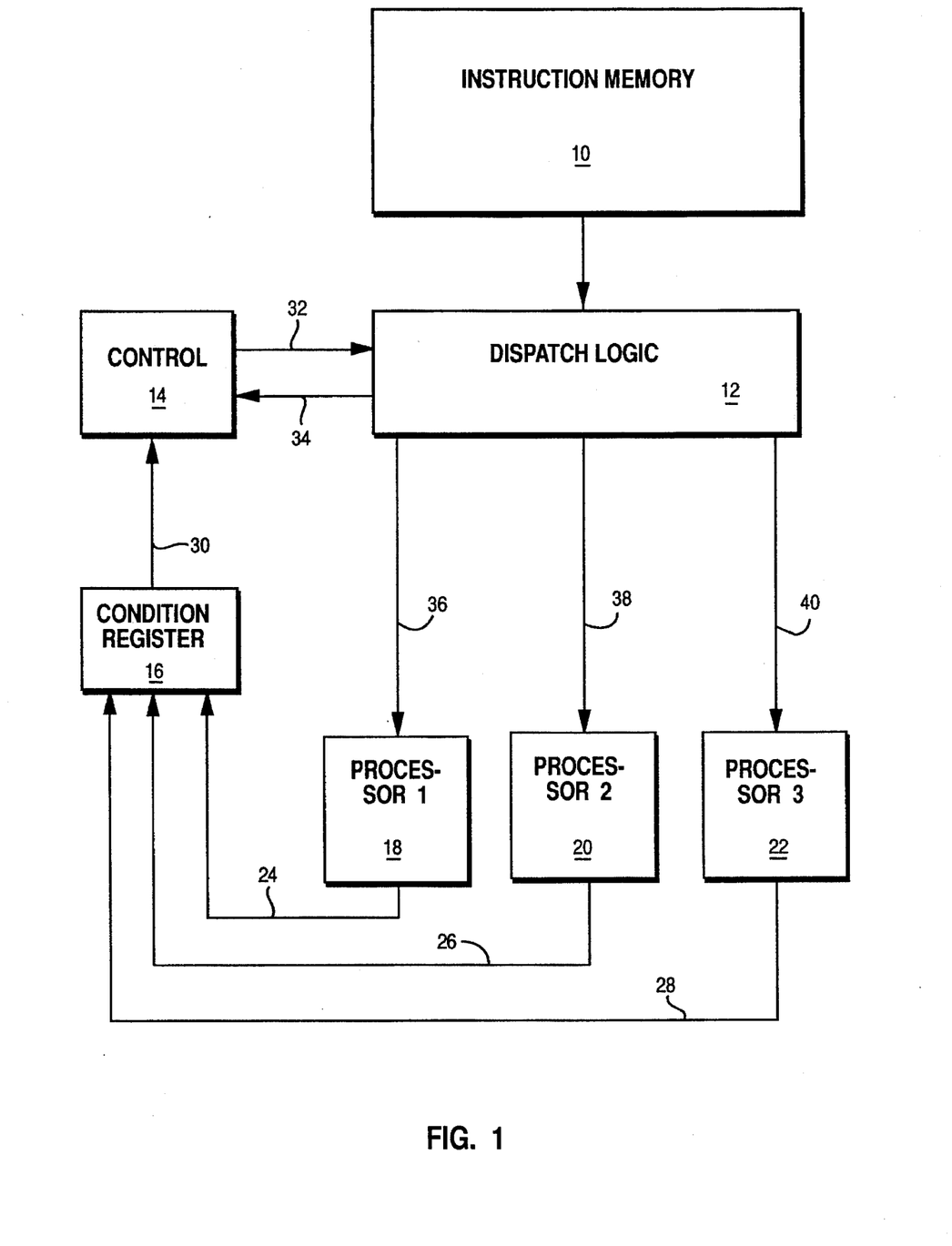
FIG. 1 is a block diagram of the instruction dispatch circuitry.

FIG. 1 is a block diagram of a multi-processing system including an instruction memory 10 containing a sequence of instructions connected to dispatch logic 12. Control logic 14 is connected via lines 32 and 34 to dispatch logic 12. A condition register 16 is connected to the control logic via line 30. In this invention, a condition register is a register containing a series of bins where each bit characterizes a result of a computational operation. Dispatch logic 12 is connected by lines 36, 38 and 40 respectively to processor 18, processor 20 and processor 22. Processor 18, processor 20 and processor 22 are connected via lines 24, 26 and 28 respectively to the condition register 16. As previously stated, this multi-processing system in FIG. 1 executes a sequence of instructions stored in instruction memory 10 as if the instructions were being executed in sequence. However, the processors 18, 20 and 22 may execute instructions ahead of sequence. The invention addresses the dispatching of the instructions from the dispatch logic 12 to ensure that an instruction dependent upon a previous instruction in the sequence altering the condition register, is not executed before the condition register is so altered.

Figure 2:
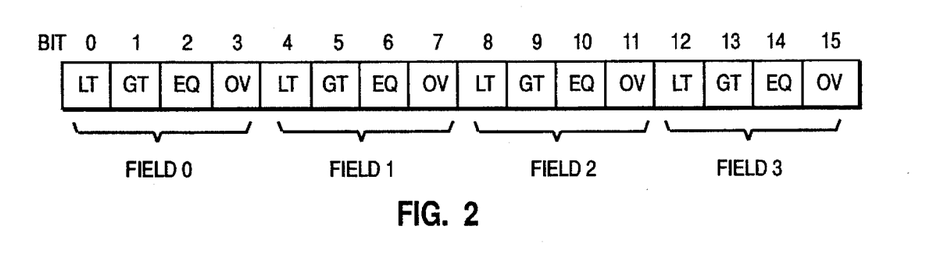
FIG. 2 is a diagram illustrating the contents of a condition register.

FIG. 2 is a diagram of the contents of the condition register. In this preferred embodiment the condition register consists of 16 bits divided into four fields. Each field is identical containing four bits. In this example, the 0 signifies a less than condition, bit 1 signifies a greater than condition, bit 2 signifies an equal condition and bit 3 signifies an overflow condition. Also in the preferred embodiment, a field is dedicated to a specific processor performing special purpose instructions such as a floating point processing unit.

Figure 3:
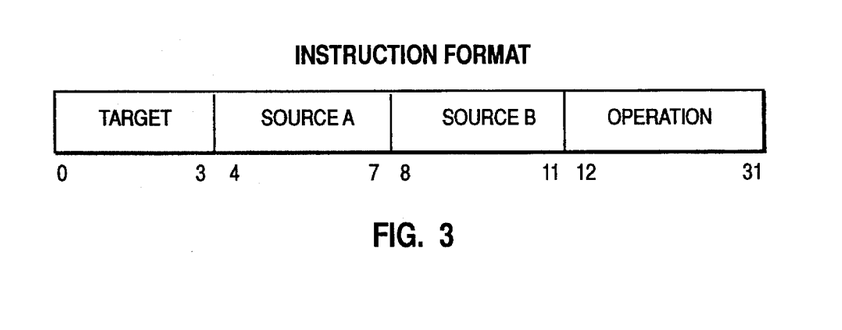
FIG. 3 is a diagram illustrating an instruction format.

FIG. 3 is a diagram of the instruction format. In the instruction format of the preferred embodiment the first four bits indicate a target designation which can either be a target register or a target bit or field designation in the condition register. If the four bits designate a target register this signifies a general purpose register in the processor that is executing the instruction. These fields may also designate portions of the condition register for modification or access. Likewise, bits 4 through 7 and bits 8 through 11 signify a source A and source B general purpose registers. Bits 12 through 31 specify the operation to be performed.

Figure 4:
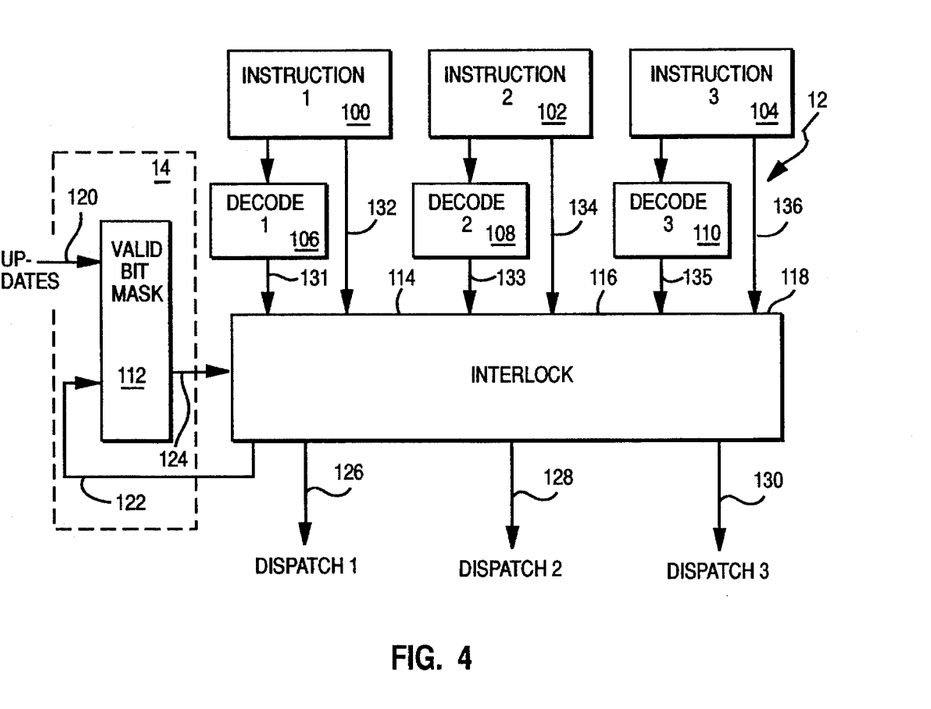
FIG. 4 is a block diagram illustrating the contents of the dispatch logic.

FIG. 4 is a diagram illustrating the dispatch logic 12 and control circuit 14. The control circuit 14 includes valid bit mask logic 112 that receives updates on lines 120 (corresponding to line 30 in FIG. 1). The valid bit mask logic output is provided on line 124 (corresponding to line 32 in FIG. 1). The valid bit mask logic 112 receives data on line 122 (corresponding to line 34 in FIG. 1). The dispatch logic 12 consists of instruction latches 100, 102 and 104 together with the decoding circuits 106, 108 and 110 connected to an interlock circuit 118. In operation, three instructions are fetched during a single cycle from the instruction memory 10 (FIG. 1) and placed in the instruction latches 100, 102 and 104. The instructions are provided to the interlock logic 118 and to their respective decode logics 106, 108 and 110 which in turn provides information to the interlock logic 118. The output of the interlock logic 118 on lines 126, 128 and 130 provide signals which indicate to dispatch the instructions to their respective processors.

Figure 5:
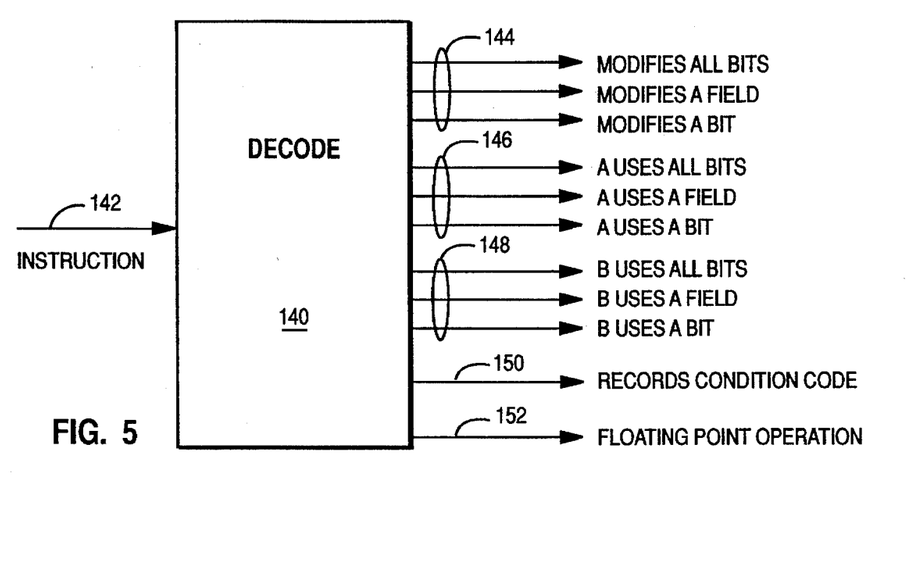
FIG. 5 is a block diagram illustrating the input and output of the instruction decode logic for the dispatch logic circuit.

FIG. 5 illustrates the contents of the decoding logic illustrated in FIG. 4. In FIG. 5 the instruction is provided on line 142 and decoded by hardwired logic to provide the signals shown. Signal 144 designates that as a result of the execution of the instruction that a modification to the condition register 16 (FIG. 1) will be made. Specifically one signal signifies that a bit will be modified, a second that a field will be modified and a third that all of the bits in the condition register 16 will be modified. Signal group 146 indicates that the source A field of the instruction when executed will use a bit, a field or all bits of the condition register. Likewise, signals 148 signify the same for the source B field. Signal 150 signifies that the instruction is a record condition code instruction that will specifically record a value into the condition register 16. Likewise signal 152 indicates that the instruction being decoded is a floating point operation.

Figure 6:
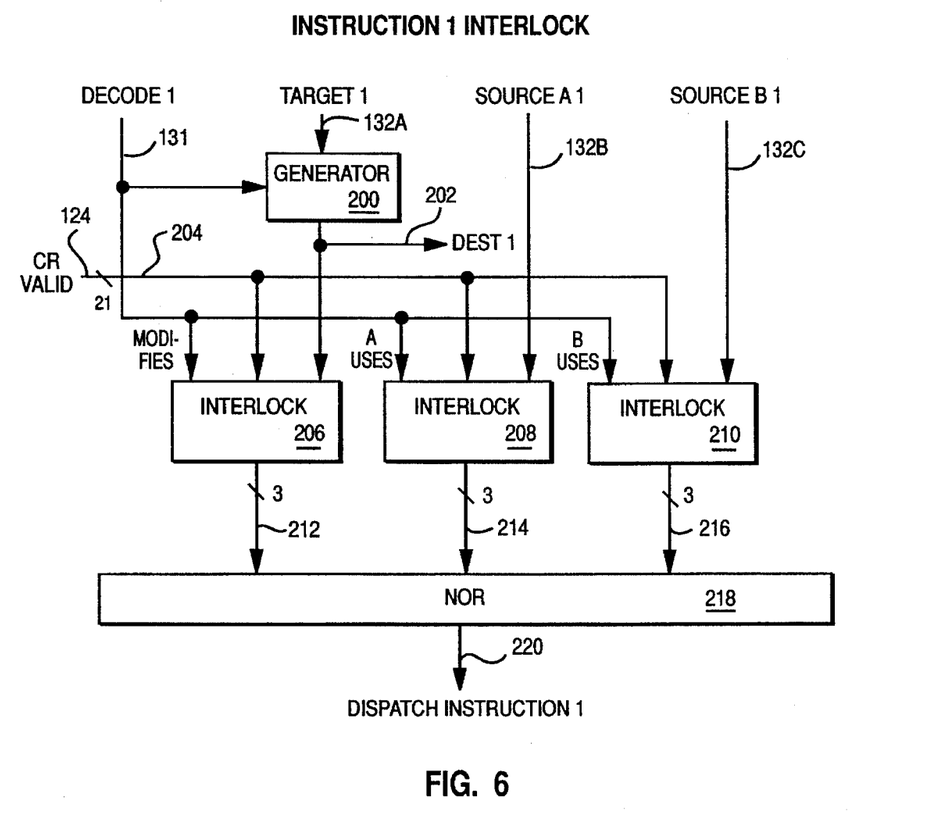
FIG. 6 is a block diagram illustrating the contents of the instruction 1 interlock circuit.

FIG. 6 illustrates the contents of the interlock circuit for instruction 1. The target field is provided over line 132a to a destination generation circuit 200. Decode signals on line 131 are also provided to the destination generation logic 200. The destination generation logic 200 provides an output signal on line 202. The interlock circuitry consists of three condition register interlock circuits 206, 208 and 210 which receive inputs from the decode logic, the condition register valid lines (i.e., the valid bit mask logic 112, FIG. 4), and either the source A or source B fields or the output of the destination generation logic 200. The output of the three condition register interlock circuits 206, 208 and 210 provide inputs to a NOR gate 218 which provides a single bit output on line 220 designating whether or not instruction 1 can be dispatched.

In operation, the interlock logic of FIG. 6 simply determines that 1) instruction 1 has a dependency upon at least a portion of the contents of the condition register 16 (FIG. 1) and 2) that the specific portion of the condition register is currently valid (i.e., that the condition register portion can either be read nor written to at that time). Therefore, if the required portion of the condition register is not valid, then the instruction will wait to be dispatched at a later cycle.

Figure 7:
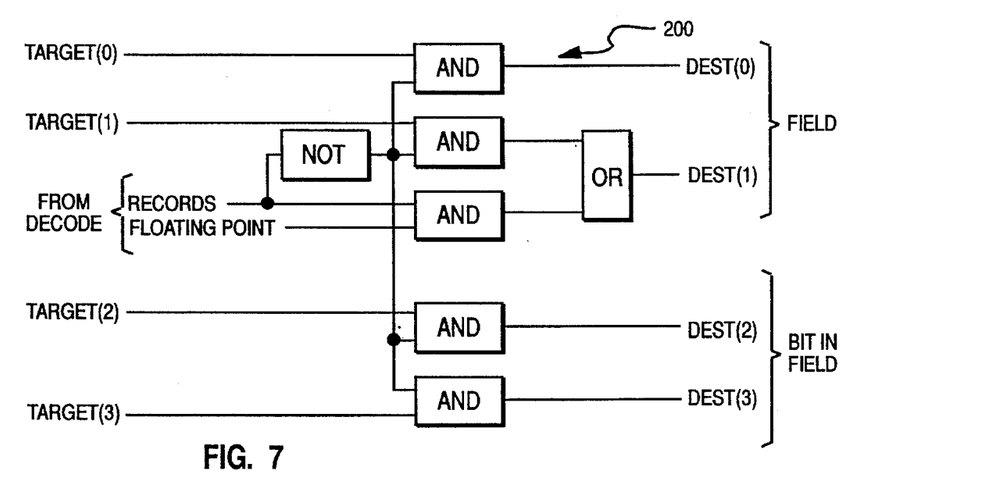
FIG. 7 is a block diagram illustrating the contents of the instruction 1 destination generation circuit.

FIG. 7 is a detail logic diagram of the destination generation logic 200. The four bit target field is provided as shown together with the record and floating point lines from the decode logic. The output of the designation generation logic 200 indicates the field and bits in the field that are to be altered by the instruction.

Figure 8:
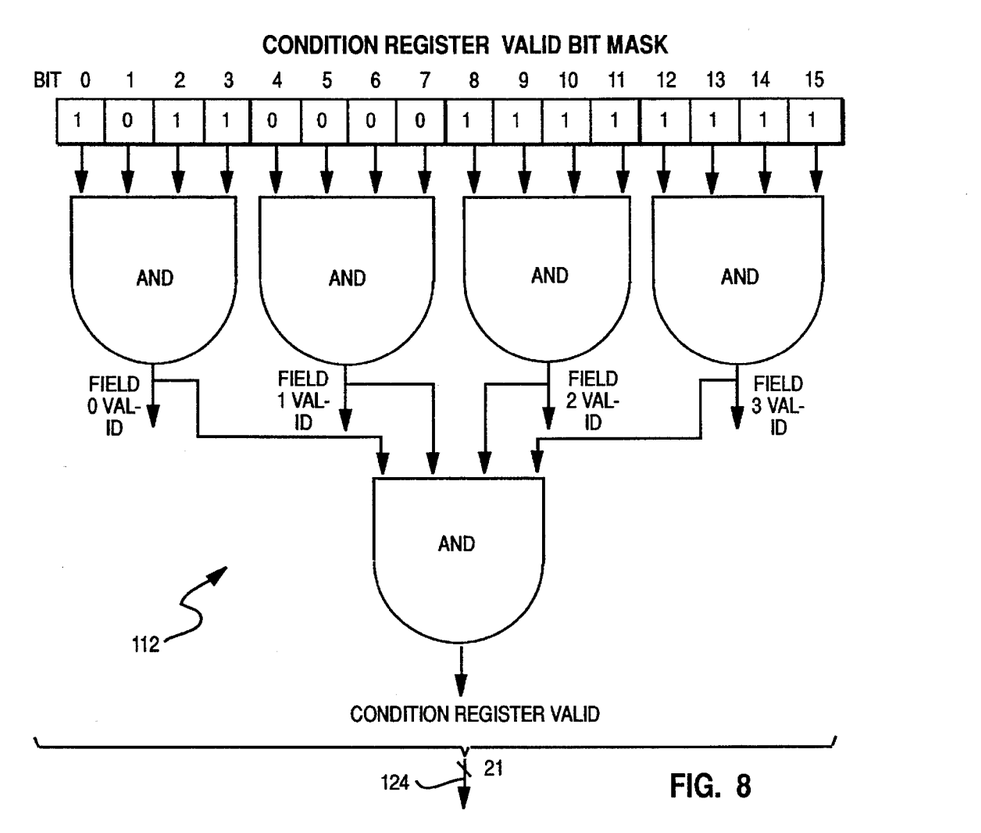
FIG. 8 is a logic diagram illustrating the contents of the condition register valid logic.

FIG. 8 is a logic diagram illustrating the valid bit mask logic that indicates whether the bits, field or total register is valid on 21 lines provided as line 124 (FIG. 1).

Figure 9:
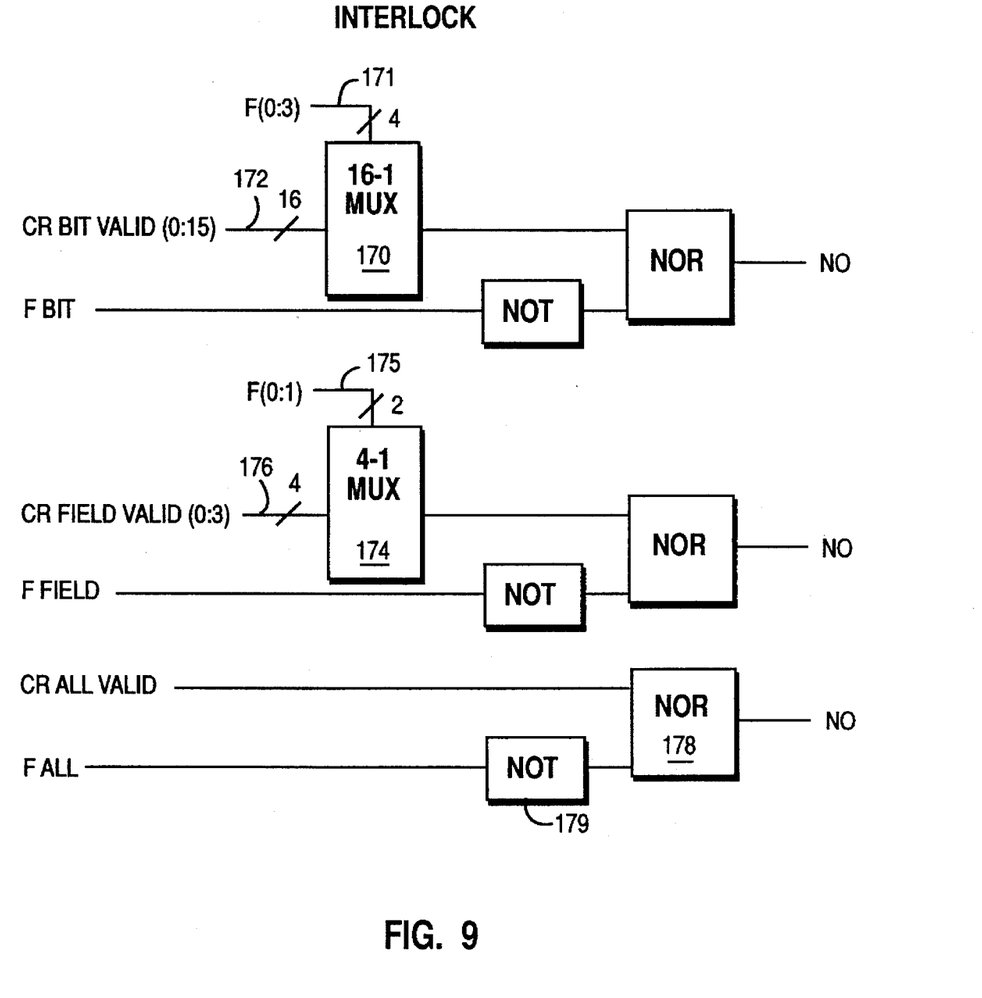
FIG. 9 is a block diagram illustrating the contents of the condition register interlock circuit.

The condition register interlock logic is illustrated in FIG. 9. In FIG. 9 the multiplexer 170 receives either the destination, source A or source B fields over line 171 and this selects one of the condition register bit valid signals on line 172. The output of the multiplexer 170 is combined with the modifies, A uses, or B uses bit signals from the decoder to provide an indication as to whether or not the instruction should be dispatched. Likewise, multiplexer 174 receives the two most significant bits of either destination, source A, or source B fields on line 175 and selects one of the condition register field valid signals on line 176. This is combined with the modifies, A uses, or B uses field signals from the decode logic to provide an indication as to whether or not the instruction should be dispatched. Lastly, the NOR gate 178 and NOT gate 179 are connected to the modifies, A uses or B uses ALL line from the decode logic and the condition register ALL valid line from the valid bit mask logic from 112 to provide an indication as to whether or not the instruction should be dispatched.

Figure 10:
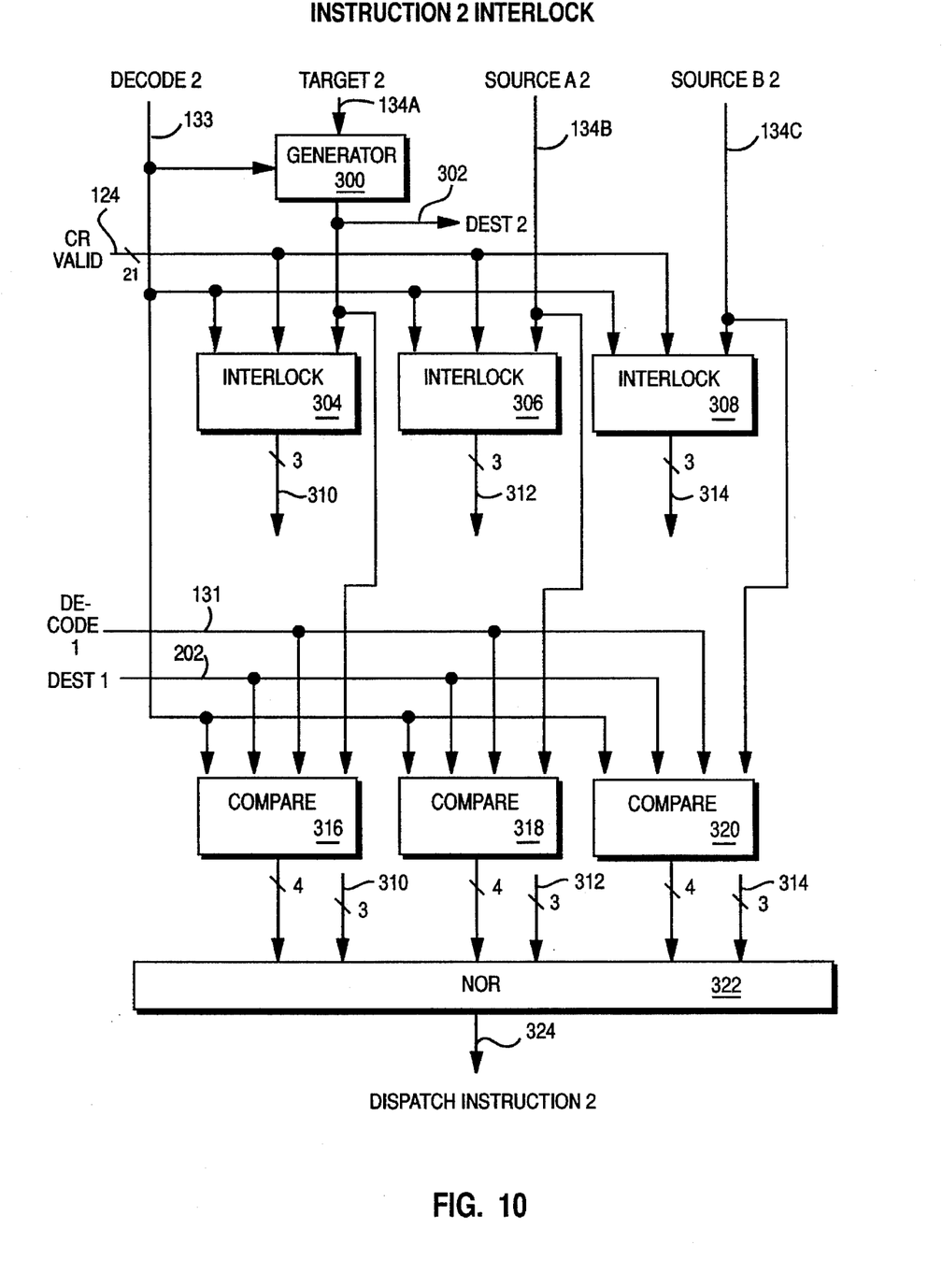
FIG. 10 is a block diagram illustrating the instruction 2 interlock circuit.

FIG. 10 is the interlock logic for instruction 2. The interlock logic in FIG. 10 is partially similar to the interlock logic for instruction 1 except that three additional compare circuits 316, 318 and 320 are provided. The destination generation circuit 300 and the condition register interlock circuits 304, 306 and 308 are similar to those corresponding in the instruction 1 interlock logic. However, the output of the instruction 2 interlock logic also includes the compare circuits 316, 318 and 320 connected to the destination generation output 302, the source A and source B fields, the decode 2 line 133 (decoding for instruction 2) together with the decode 1 signal on line 131 and the destination generation signal on line 202, both from the instruction 1 interlock logic.

Figure 11:
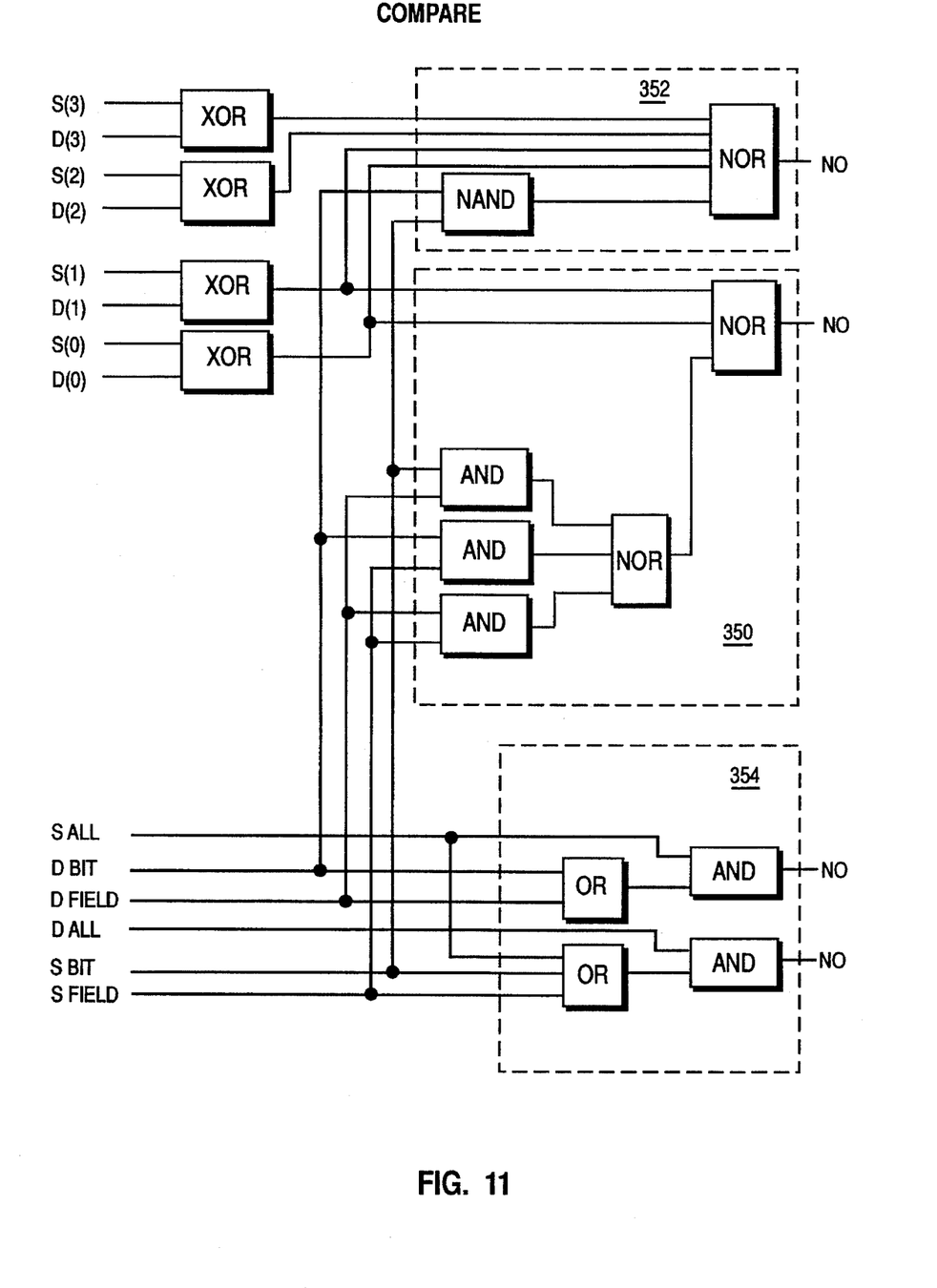
FIG. 11 is a logic diagram illustrating the contents of the compare circuit.

FIG. 11 illustrates the contents of the compare logic. The compare logic provides an indication that there is no condition register dependency between instruction 2 and instruction 1. The logic in 352 indicates whether there is a condition register dependency of any individual bit location between instruction 1 and instruction 2. Logic 350 determines if there is a condition register dependency between the fields of instruction 1 and instruction 2. Likewise logic 354 determines whether or not there is a condition register dependency for the whole condition register (all bits in the condition register) between instruction 1 and instruction 2. The NOR gate 324 receives inputs from interlock logic 304, 306, and 308 together with compare circuits 316, 318, and 320 320 to provide an indication on line 324 whether or not instruction 2 should be dispatched.

Figure 12:
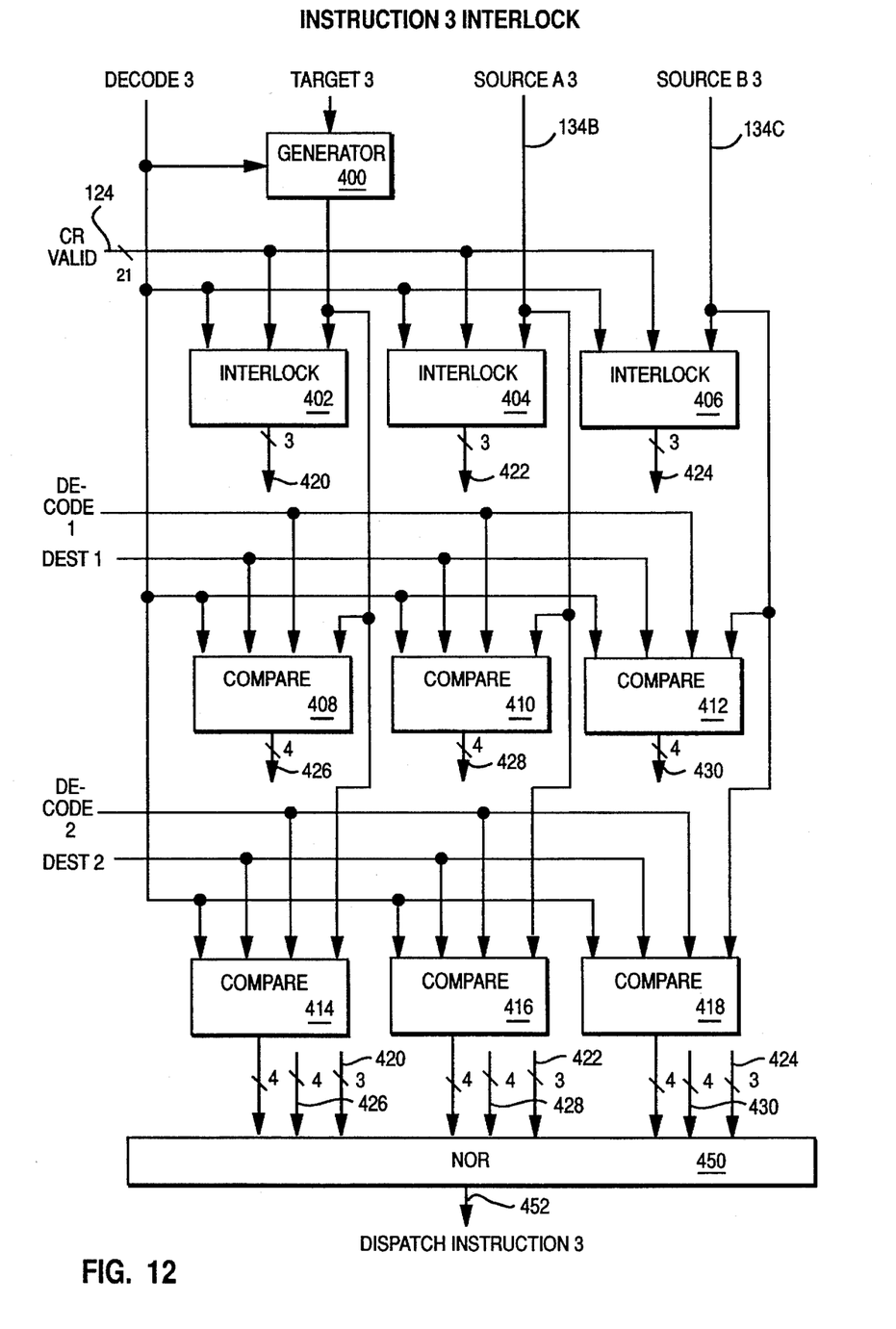
FIG. 12 is a block diagram illustrating the instruction 3 interlock circuit.

FIG. 12 is interlock logic for instruction 3. Note in FIG. 12 that the destination generation logic 400 and the condition register interlock logic 402, 404 and 406 are similar to their corresponding elements for the instruction 1 interlock logic and the instruction 2 interlock logic. Furthermore the compare circuits 408, 410 and 412 are similar to the compare circuits 316, 318 and 320 in the instruction 2 interlock logic. In addition the instruction 3 interlock logic includes the compare circuits 414, 416 and 418. The destination generation logic 400 together with the condition register interlock 402, 404, and 406 provide an indication as to whether or not there is a condition register dependency of instruction 3 on any of the portions of the condition register that may be currently invalid (indicated by line 124). Likewise, the compare circuits 408, 410 and 412 indicate whether there is a condition register dependency between instruction 1 and instruction 3. Likewise the compare circuits 414, 416 and 418 determine if there is a condition register dependency between instruction 3 and instruction 2. The NOR gate 450 receives inputs from the condition register interlock logics 402, 404 and 406 together with the compare circuits 408, 410, 412, 414, 416 and 418 to provide an indication on line 452 whether or not instruction 3 can be dispatched.

It should be understood that the embodiment discussed herein provides that instructions 2 and 3 will never modify contents of the condition register before instruction 1 can access the condition register. Likewise instruction 3 will not modify the contents of the condition register before instruction 2 can access it. In other words, if instruction 1 reads a bit, a field or all of the condition register, instruction 3, if it is modifying any portion of the condition register, will do so in proper sequence even through instruction 1 and instruction 3 may be dispatched simultaneously.

However, from the teachings of this invention it should be apparent as to the method of providing for conditional dispatches to guarantee that instruction 1 and instruction 3 condition register dependencies do not exist. This would be provided by adding compare circuits to the interlock logic which would guarantee that subsequent instructions are not dispatched if they modify a field or bit of the condition register which is being used as a source for by a previous instruction. The compare circuits would be similar to those already disclosed and would provide additional inputs to the NOR gates which generate the dispatch signals. As an example, for instruction 2, two banks of 3 compare circuits would be added which have source A and source B as inputs from instruction 1.

Figure 13:
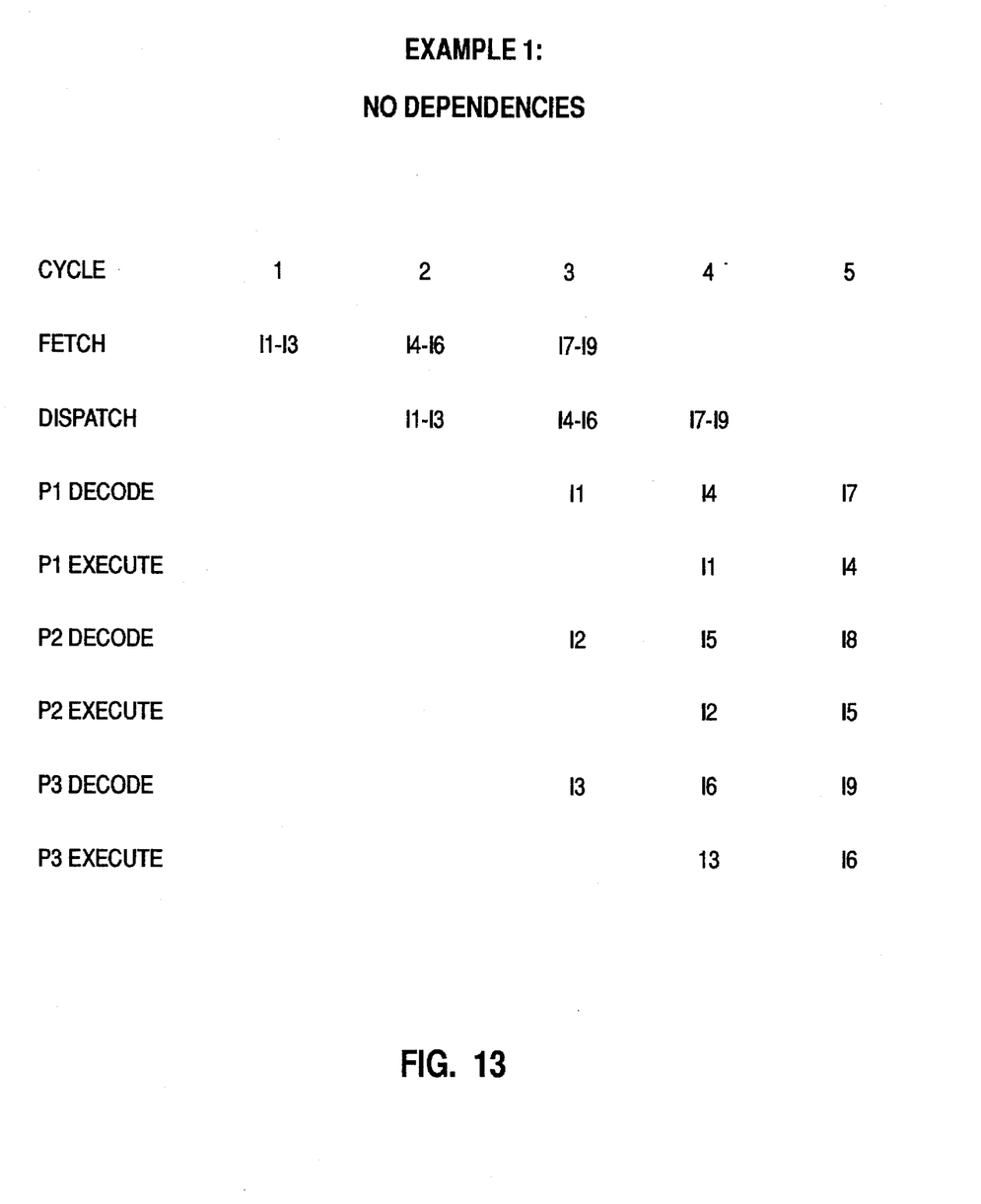
FIG. 13 is a timing diagram illustrating the pipeline execution of an instruction sequence with no dependencies.

FIG. 13 is a timing diagram illustrating an example where there are no data dependencies between instructions. In cycle 1 instructions 1 through 3 are fetched. In cycle 2, instructions 4 through 6 are fetched and instructions 1 through 3 are dispatched. In cycle 3 instructions 7 through 9 are fetched, instructions 4 through 6 are dispatched and instructions 1, 2 and 3 are decoded in their respective processors. In cycle 4 instructions 7 through 9 are dispatched and instructions 4, 5 and 6 are decoded in their respective processors while instructions 1, 2 and 3 are executed. In cycle 5, instructions 7, 8 and 9 are being decoded while instructions 4, 5 and 6 are being executed.

Figure 14:
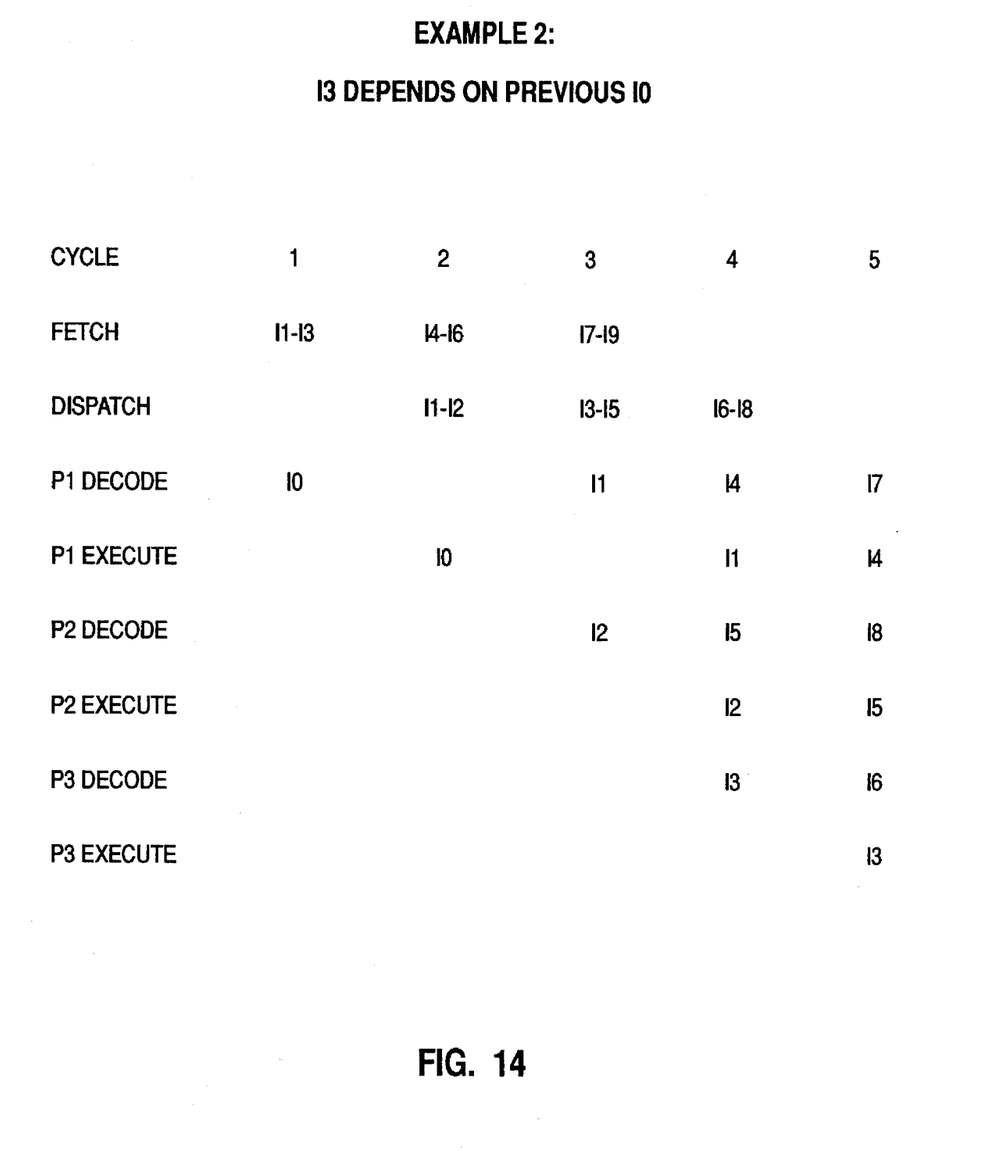
FIG. 14 is a timing diagram illustrating the pipeline execution of an instruction sequence wherein a presently fetched instruction is dependent upon the result of a previously dispatched instruction storing bits in the condition register.

FIG. 14 illustrates the operation of the invention when an instruction I3 depends upon a previously dispatched instruction I0. In cycle 1, instructions 1 through 3 are fetched while the instruction I0 is decoded in processor 1. In cycle 2 only instructions 1 and 2 are dispatched (the condition register dependency requires that instruction 3 not be dispatched until instruction I0 completes its execution in order that the condition register contain the data required for instruction 3 execution). In cycle 3, instruction 3 is finally dispatched after the execution of instruction 0.

Figure 15:
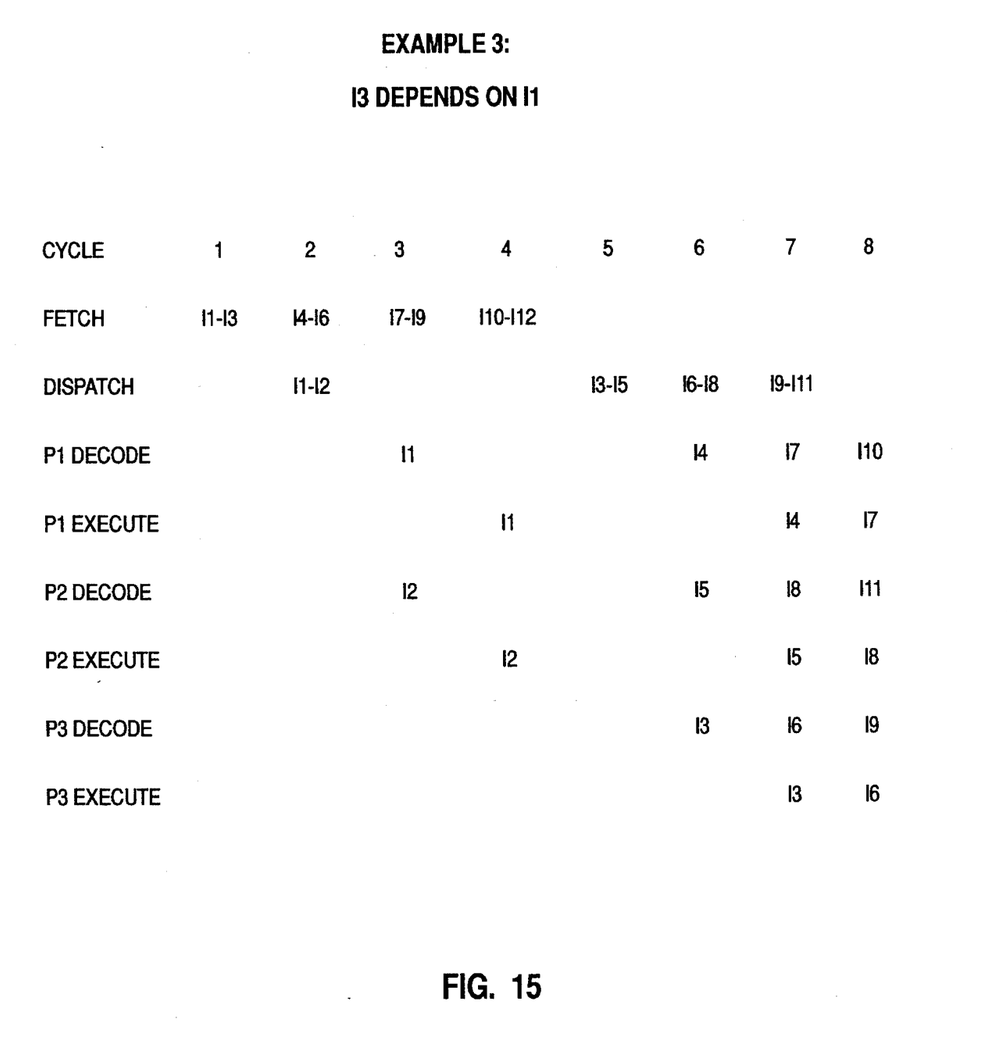
FIG. 15 is a timing diagram illustrating the pipeline execution of simultaneously fetched instructions where one of the fetched instructions is dependent upon the execution completion of another simultaneously fetched instruction.

In FIG. 15 a timing diagram is illustrated where instruction 3 depends upon instruction 1 and instruction 1 and instruction 3 are fetched in the same cycle. In cycle 1 instructions 1 thru 3 are fetched. In cycle 2, instructions 4 thru 6 are also fetched and only instructions 1 and 2 are dispatched (since instruction 3 depends upon the completion of execution of instruction 1). Therefore in cycle 3 while instructions 7 through 9 are fetched, there are no instructions dispatched since instruction 3 must remain until instruction 1 is executed. Finally, in cycle 4 instruction 1 is executed. Therefore in cycle 5, instructions 3 through 5 are dispatched.

Although the invention has been described with the reference to the specific embodiments, this description is not meant to be construed in a limiting sense. Various modifications of the discussed embodiment, as well as other embodiments of the invention, will become apparent to those persons skilled in the art upon reference to the description of this invention. It is, therefore, contemplated that the appended claims will cover any such modifications or embodiments as may fall with the true scope of the invention.

We claim:

1. A data processing system comprising:
   means for providing sequential clock cycles individually corresponding to single system computation cycles;
   means for storing a plurality of instructions in sequence within an instruction memory;
   means for selectively dispatching a plurality of instructions following the sequence in which the instructions were stored in the instruction memory during a single clock cycle to selected processors for execution;
   means for determining for each instruction to be dispatched by the means for dispatching whether that instruction may when executed be dependent upon a bit in a condition register characterizing a previous instruction result;
   means for monitoring the setting of said bit in said condition register and providing an indication thereof; and
   control means for selectively delaying the dispatch of one or more instructions during the clock cycle when said means for determining indicates that the instruction is dependent upon the setting of said bit and that said means for monitoring indicates that said bit has not been set.

2. The apparatus recited in claim 1, further comprising a means for fetching a plurality of instructions from said means for storing during a single clock cycle.

3. The data processing system according to claim 2 wherein said condition register includes a plurality of fields, a first of said fields including said bit and characterizing a result of a predetermined class of instruction execution.

4. A data processing system according to claim 3 wherein each instruction includes a target operand storage designation and at least two source operand storage designations.

5. A data processing system according to claim 4 wherein said control means includes means for determining validity of the contents of the condition register.

6. A data processing system according to claim 5 wherein said control means includes means for determining if execution of a fetched instruction will modify at least one bit of those in said fields of said condition register.

7. A data processing system according to claim 6 wherein said control means includes means for determining if execution of a fetched instruction will read at least one bit of those in said fields of said condition register.

8. A data processing system comprising:

means for providing sequential clock cycles individually corresponding to single system computation cycles;

means for storing a plurality of instructions in sequence within an instruction memory;

means for selectively dispatching a plurality of instructions following the sequence in which the instructions were stored in the instruction memory during a single clock cycle to selected processors for execution;

means for determining for each instruction to be dispatched by the means for dispatching whether that instruction may when executed set bit in a condition register to be accessed by a processor executing a previous instruction;

means for monitoring the accessing of said bit in said condition register and providing an indication thereof; and control means for selectively delaying the dispatching of one or more instructions during the clock cycle when execution of a previous instruction has not accessed said bit in said condition register, as indicated by the means for determining.

9. The apparatus recited in claim 8, further comprising a means for fetching plurality of instructions from said means for storing during a single clock cycle.

10. A data processing system according to claim 9 wherein said condition register includes a plurality of fields, a first of said fields including said bit and characterizing a result of a predetermined class of instruction execution.

11. A data processing system according to claim 10 wherein each instruction includes a target operand storage designation and at least two source operand storage designations.

12. A data processing system according to claim 11 wherein said control means includes means for determining validity of the contents of said condition register.

13. A data processing system according to claim 12 wherein said control means includes means for determining if execution of a fetched instruction will modify at least one bit of those in said fields of said condition register.

14. A data processing system according to claim 13 wherein said control means includes means for determining if execution of a fetched instruction will read at least one bit of those in said fields of said condition register.

15. A method for providing instructions in a data processing system comprising the computer implemented steps of:

providing sequential clock cycles individually corresponding to single system computation cycles;

storing a plurality of instructions in sequence within an instruction memory;

dispatching a plurality of selected instructions following the sequence in which the instructions were stored in the instruction memory to selected processors during a single clock cycle;

determining when an instruction execution is dependent upon a previous instruction setting a bit in a condition register characterizing a previous instruction result;

monitoring the setting of said bit in the condition register and providing an indication thereof; and selectively delaying the dispatching of an instruction during the clock cycle the instruction is to be dispatched when there is an indication that the instruction is dependent upon the setting of said bit and that there is no indication that said bit has been set.

16. A method for providing instructions in a data processing system comprising the computer implemented steps of:

providing sequential clock cycles individually corresponding to single system computation cycles;

storing a plurality of instructions in sequence within an instruction memory;

dispatching a plurality of selected instructions following the sequence in which the instructions were stored in the instruction memory to selected processors during a single clock cycle;

determining for each instruction to be dispatched whether that instruction may when executed set a bit in a condition register to be accessed by a processor executing a previous instruction;

monitoring the access of said bit in said condition register and providing an indication thereof; and selectively delaying the dispatching of an instruction during the clock cycle the instruction is to be dispatched when execution of a previous instruction has not accessed said bit in said condition register.

17. A data processing system comprising:

means for providing sequential clock cycles individually corresponding to single system computation cycles;

means for selectively dispatching in sequence a plurality of sequentially stored instructions from storage within an instruction memory during a single clock cycle to selected processors for execution;

means for determining within a clock cycle whether instructions subject to dispatch may depend on settings in fields of a condition register, wherein the settings in the fields are related to previous instructions executing in processors;

control means for selectively delaying the dispatch of an instruction during the clock cycle when said means for determining indicates that the instruction is dependent upon the setting of a condition register field that has not been set.

18. The apparatus recited in claim 17, further comprising a means for fetching a plurality of instructions during a single clock cycle.

19. The data processing system according to claim 18 wherein said condition register includes for a first of said plural fields a bit characterizing a result of a predetermined class of instruction execution.

20. A data processing system according to claim 19 wherein each instruction includes a target operand storage designation and at least two source operand storage designations.

21. A data processing system according to claim 20 wherein said control means includes means for determining validity of the contents of the condition register.

22. A data processing system according to claim 21 wherein said control means includes means for determining if execution of a fetched instruction will modify at least one bit of those in said fields of said condition register.

23. A data processing system according to claim 22 wherein said control means includes means for determining if execution of a fetched instruction will read at least one bit of those in said fields of said condition register.

24. A data processing system comprising:
means for providing sequential clock cycles individually corresponding to single system computation cycles;
means for selectively dispatching in sequence a plurality of sequentially stored instructions from storage within an instruction memory during a single clock cycle to selected processors for execution;
means for determining within a clock cycle whether instructions subject to dispatch may when executed set a field of a condition register that is to be accessed by a processor executing a previous instruction; and
control means for selectively delaying the dispatch of the instruction during the clock cycle when said means for determining indicates that the accessing of the condition field has not been accomplished.

25. The apparatus recited in claim 24, further comprising a means for fetching a plurality of instructions from said means for storing during a single clock cycle.

26. A data processing system according to claim 25 wherein said condition register includes for a first of said plural fields a bit characterizing a result of a predetermined class of instruction execution.

27. A data processing system according to claim 26 wherein each instruction includes a target operand storage designation and at least two source operand storage designations.

28. A data processing system according to claim 27 wherein said control means includes means for determining validity of the contents of said condition register.

29. A data processing system according to claim 28 wherein said control means includes means for determining if execution of a fetched instruction will modify at least one bit of those in said fields of said condition register.

30. A data processing system according to claim 29 wherein said control means includes means for determining if execution of a fetched instruction will read at least one bit of those in said fields of said condition register.

31. A data processing system comprising:
means for providing sequential clock cycles individually corresponding to single system computation cycles;
an instruction memory for storing a plurality of instructions in sequence;
means for fetching a plurality of instructions during a first clock cycle;
at least one condition register related to multiple processors; and
means for resolving dependencies reflected in the condition register and dispatching selected instructions in the sequence stored in the instruction memory to multiple processors for execution, during a second clock cycle following the first clock cycle.

32. A data processing system comprising:
a clock providing clock cycles individually corresponding to single system computation cycles;
a plurality off processors, each for independently executing instructions and indicating a condition code resulting from instruction execution;
an instruction memory for storing a plurality of instructions in sequence;
a condition register containing condition codes indications from at least two of said processors; and
means for dispatching a plurality of instructions in the sequence stored in the instruction memory during a single clock cycle to at least two of said processors, said dispatching means including means for determining a condition code dependency for each instruction and having means for delaying the dispatching of any instruction having a condition code dependency.

33. The system recited in claim 32, wherein said means for determining a condition code dependency for each instruction performs the determining in a single clock cycle.

34. The system recited in claim 33, wherein the means for delaying the dispatch of any instruction having a condition code dependency also delays the dispatch of instructions sequentially following the delayed instruction.

35. A data processing system comprising:
a clock providing clock cycles individually corresponding to single system computation cycles;
a plurality of processors, each for independently executing instructions and indicating a condition code resulting from instruction execution;
an instruction memory for storing a plurality of instructions in sequence;
a register containing condition codes indications from at least two processors and including means indicating if said condition codes indications are valid; and
means for dispatching a plurality of instructions in the sequence stored in the instruction memory during a single clock cycle to at least two of said processors when condition codes indications for each instruction are valid.

* * * * *